Feb. 4, 1958 J. W. LUDOWICI 2,822,055
COMBINATION MOTOR VEHICLES
Filed Sept. 25, 1953 3 Sheets-Sheet 1
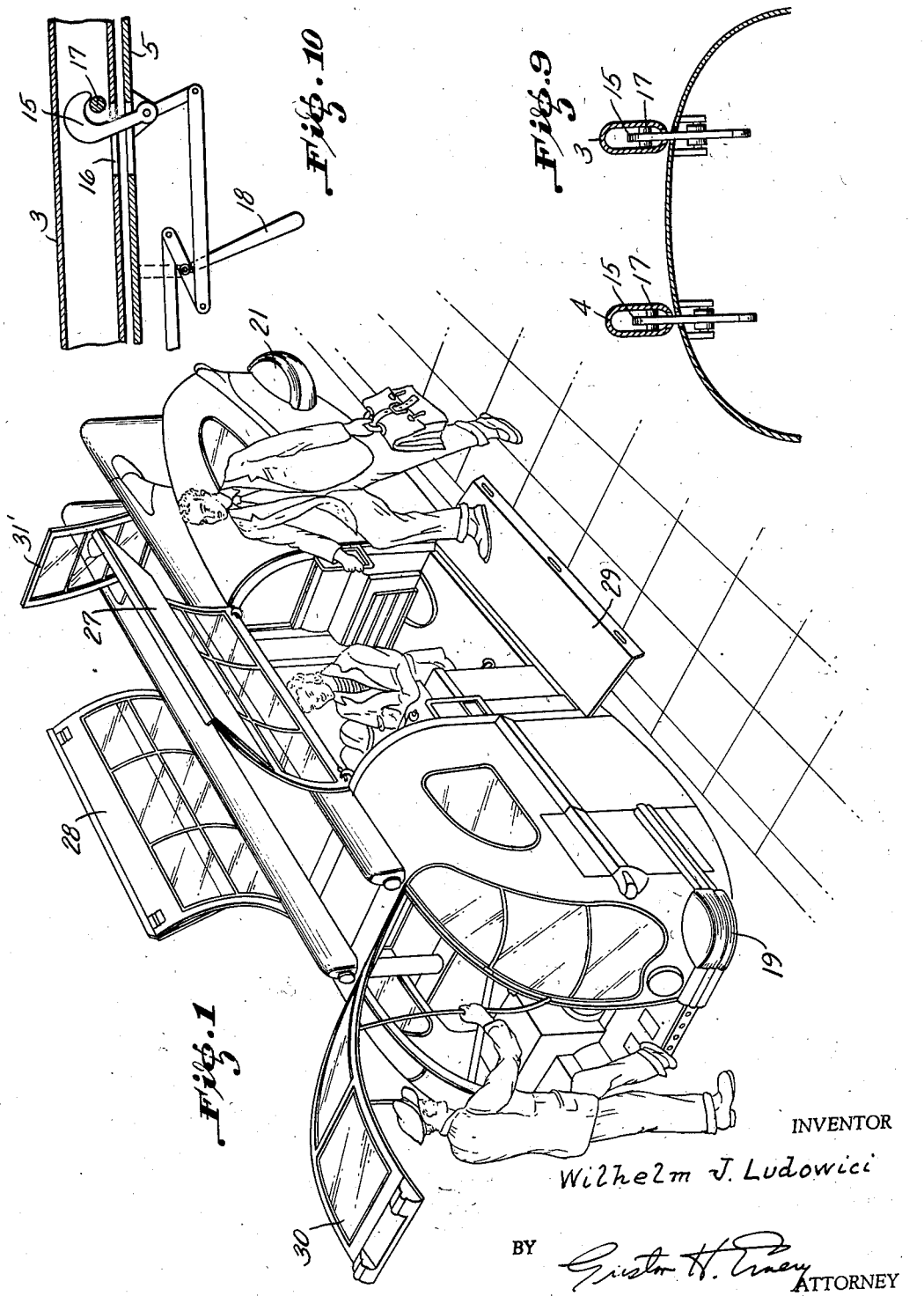
INVENTOR
Wilhelm J. Ludowici
BY
ATTORNEY Feb. 4, 1958  J. W. LUDOWICI  2,822,055
COMBINATION MOTOR VEHICLES
Filed Sept. 25, 1953  3 Sheets-Sheet 2
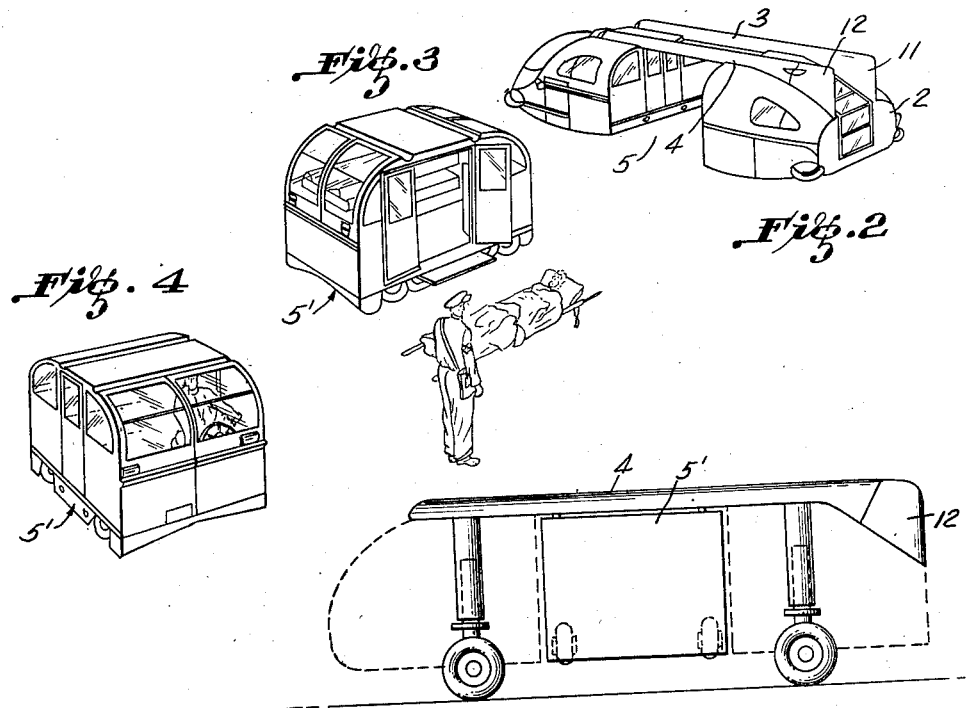
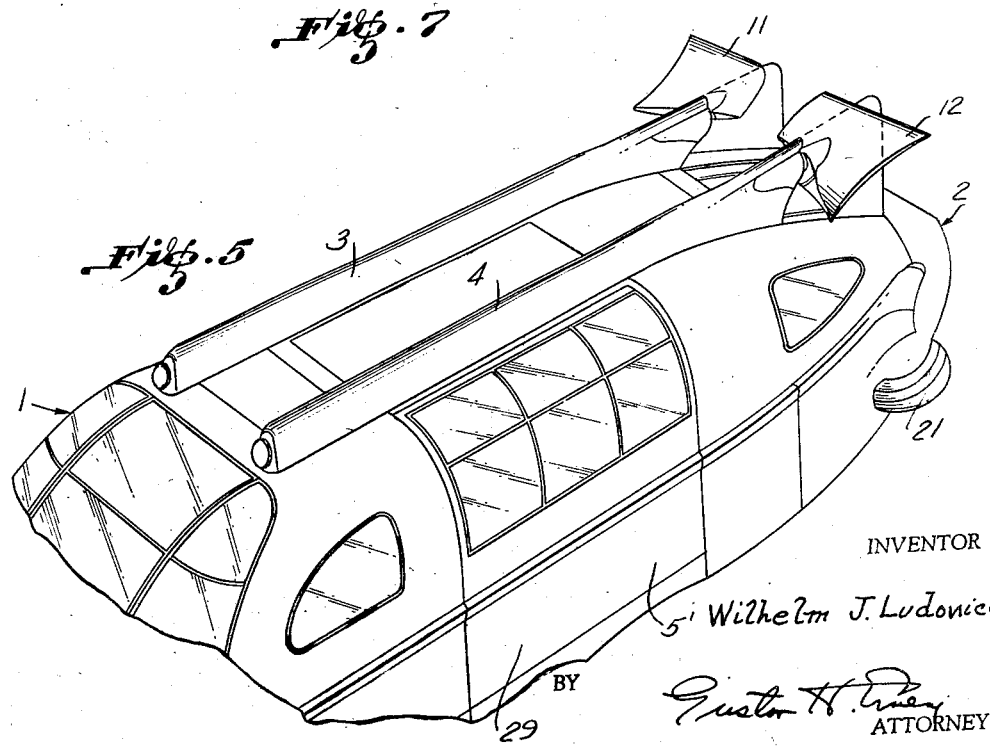
INVENTOR
Wilhelm J. Ludowici
BY
Gustav H. Tracy
ATTORNEY Feb. 4, 1958 J. W. LUDOWICI 2,822,055
COMBINATION MOTOR VEHICLES
Filed Sept. 25, 1953 3 Sheets-Sheet 3
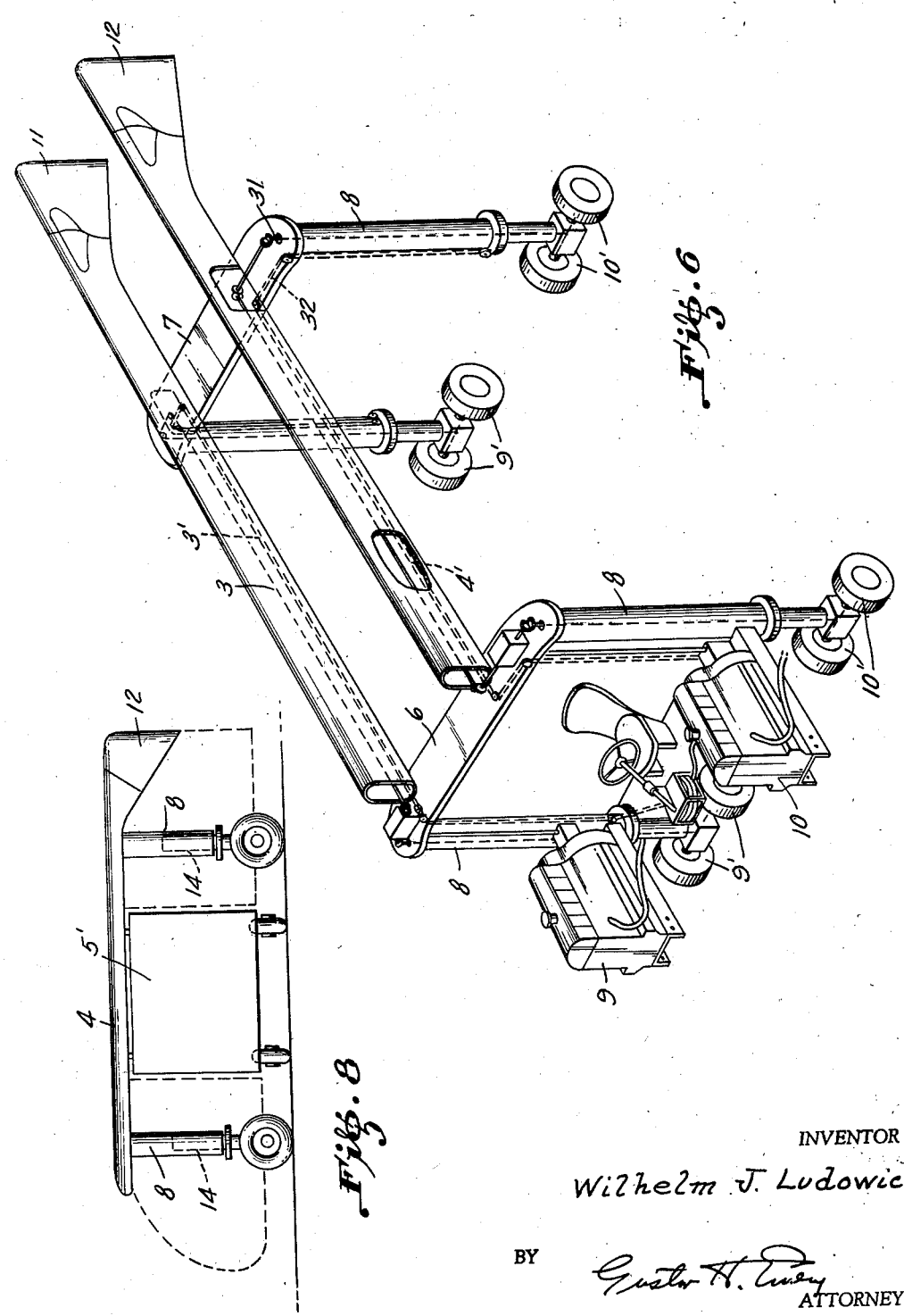
INVENTOR
Wilhelm J. Ludowici
BY
ATTORNEY

United States Patent Office 2,822,055
Patented Feb. 4, 1958

2,822,055
COMBINATION MOTOR VEHICLES

Johann Wilhelm Ludowici, Jockgrim, Pfalz, Germany

Application September 25, 1953, Serial No. 382,420

3 Claims. (Cl. 180—1)

This invention relates to a special composite vehicle of the motor driven type.

It is an object of the invention to so construct a motor vehicle that it is capable of many uses during such time as the vehicle is in motion and travelling from point to point. A further object of the invention is to provide a motor vehicle in which the entire vehicle is divided into a plurality of parts such as the front and rear parts and a central part, which latter is entirely separable and may be towed or driven independently from the main vehicle. It is also a still further object to provide various safety devices to insure a more useful vehicle and to increase its utilitarian qualities.

Another object of the invention resides in the provision of spare tires mounted in each corner of the composite vehicle and rotatable on a vertical axis. A further object resides in a structure in which movable wing vanes are mounted on the rear end of the composite vehicle so that in one position of the vanes the latter will act to provide a pressure on the rear wheels during travel of the vehicle.

Further objects will be apparent from the following description when considered in connection with the accompanying drawings in which:

Figure 1 is a perspective view of the composite vehicle,

Figs. 2 to 4 are perspective views showing the various units of the composite vehicle, Fig. 5 is a perspective view of a part of the composite vehicle showing the rear wing positions, Fig. 6 is a perspective view of the chassis of the vehicle, Figs. 7 and 8 are diagrammatic side views of the composite vehicle, Fig. 9 is a cross section of a detail of the vehicle, and Fig. 10 is a section of a detail.

The motor vehicle consists of a forward part 1 and a rear part 2 which are interconnected by means of top frame members 3 and 4, Fig. 5. Between the parts 1 and 2 and under the frame members 3 and 4 a space 5 is formed, Fig. 2, to accommodate a central vehicle 5' which latter as assembled as a composite vehicle, Fig. 1, may be secured not only to the end parts 1 and 2 but also to the top frame members 3 and 4. The central vehicle 5' adapted to be self-propelled has its own motive power plant, not shown, so that it may be driven, Fig. 4 independently from the composite vehicle as assembled as shown in Figs. 1 and 5.

As shown in detail in Fig. 6, the frame members 3 and 4 are each formed as a hollow body or tube in the internal passage of which the drive transmission 3' and 4' for the members 3 and 4 respectively may be housed to drive the rear wheels 9' and 10'. The frame members 3 and 4 are secured and supported on transverse beams 6 and 7 which latter are secured on hollow supports 8. As shown in Fig. 6 each support 8 is provided with a pair of wheels 9' and 10' and through each support a part 31 of the driving transmission for the wheels passes and also the cables 32 to operate the brakes, not shown, may be provided along each support. Also the supports 8 are adapted to carry the wires for the rear lights, stop light, etc. To motors 9 and 10 are provided, Fig. 6, and these motors drive the wheels 9' and 10' through transmission members as shown. The wheels are in pairs and may be rotated through 360° so that the vehicle may be steered in all directions.

The frame members 3 and 4 are elongated at the rear to terminate into stabilizing wings 11 and 12, each of which is mounted on a rod 13, Fig. 12, mounted at an angle and operable to adjust the positions of the wings 11 and 12 to a horizontal position as shown in Fig. 5. In this way the wings 11 and 12 may be used as stabilizers (vertical plane) and also as a height rudder (horizontal plane) to increase the pressure on the rear wheels.

The central vehicle unit 5', Fig. 7, may be provided with retractable wheels so that in the position of Fig. 8 the unit 5' may be suspended from the frame members 3 and 4 with the latter supported on the hydraulic cylinders 14 within the supports 8. The suspension of the unit 5' from the frame members 3 and 4 is accomplished by means of hook elements 15, Figs. 9 and 10, which latter grip through slits 16 in the tubular frame members 3 and 4 and which hook over the bolts or pins 17 secured in the frame members. The hook elements 15 are operated by handles 18, Fig. 10.

The central vehicle 5' which is adapted to be driven into the space 5, Fig. 2, may have various configurations, such as for instance illustrated in Figs. 3 and 4 which shows an ambulance and Fig. 1 which shows a business vehicle. The vehicle of Fig. 1 has side flaps 27 and 28 which open toward the top and a foot board or section 29 is provided on each side. At the front end there is a hinged door 30 and at the rear end a hinged door 31'.

I claim as my invention:

1. A vehicle comprising a front section and a rear section spaced from each other, traction drive wheels on each section, a pair of hollow beams secured to the sections in laterally spaced relation on the top of each section, a central space being provided between the front and rear sections and under the beams, an intermediate section having wheels adapted for retraction to and from ground contact and to be powered, and means for removably securing said intermediate section to said hollow beams between said spaced front and rear sections, whereby said intermediate section may be capable of use as a self-propelled vehicle entirely independent from the front and rear sections.

2. A vehicle according to claim 1, in which hinged doors and windows are provided in the front and rear sections.

3. A vehicle according to claim 1, in which hinged closure members are mounted on the intermediate vehicle to permit exit and entry into said intermediate vehicle when secured to the front and rear sections and when operated independently.

References Cited in the file of this patent

UNITED STATES PATENTS

| | | |
|---|---|---|
| 1,276,335 | Arringunaga | Aug. 20, 1918 |
| 1,323,126 | Tolson | Nov. 25, 1919 |
| 1,473,369 | Williams et al. | Nov. 6, 1923 |
| 1,711,629 | Wright | May 7, 1929 |
| 1,927,088 | Gerlinger | Sept. 19, 1933 |
| 2,295,085 | Keehn | Sept. 8, 1942 |
| 2,420,894 | Mee | May 20, 1947 |
| 2,425,948 | Lucien | Aug. 19, 1947 |
| 2,476,538 | Fowler | July 19, 1949 |
| 2,583,016 | Ritter | Jan. 22, 1952 |
| 2,619,361 | Connors | Nov. 25, 1952 |

FOREIGN PATENTS

| | | |
|---|---|---|
| 893,936 | France | Mar. 6, 1944 |
| 839,314 | Germany | May 19, 1952 |
| 27,144 | Great Britain | 1911 |
| 693,665 | Great Britain | July 1, 1953 |
| 321,257 | Italy | Sept. 20, 1934 |